United States Patent [19]

Nara et al.

[11] Patent Number: 4,964,072

[45] Date of Patent: Oct. 16, 1990

[54] ELECTRONIC DEVICE WITH CALENDAR FUNCTION

[75] Inventors: Seietsu Nara; Toshiyuki Kawagishi, both of Yokohama, Japan

[73] Assignee: Kabushiki Kaisha Toshiba, Kawasaki, Japan

[21] Appl. No.: 239,220

[22] Filed: Sep. 1, 1988

[30] Foreign Application Priority Data

Sep. 10, 1987 [JP] Japan ............................... 62-227322
Nov. 12, 1987 [JP] Japan ............................... 62-285919

[51] Int. Cl.[5] ............................................ G06F 15/16
[52] U.S. Cl. ............................................ 364/705.08
[58] Field of Search .................. 364/705.08; 235/377, 235/488; 368/28, 29, 30, 156

[56] References Cited

U.S. PATENT DOCUMENTS 4,193,255 3/1980 Ebihara et al. ................ 364/705.08
4,240,150 12/1980 Ebihara et al. .................... 364/705
4,303,995 12/1981 Aizawa ............................... 368/28

FOREIGN PATENT DOCUMENTS 0167044 1/1986 European Pat. Off. .
56-76871 6/1981 Japan ............................ 364/705.08
2037025 7/1980 United Kingdom .

*Primary Examiner*—Gary V. Harkcom
*Assistant Examiner*—Long T. Nguyen
*Attorney, Agent, or Firm*—Cushman, Darby & Cushman

[57] ABSTRACT

An electronic device with calendar function includes a timer for supplying a carry signal for every 24 hours in response to a clock signal and a date counter for counting the carry signal. A central processing unit (CPU) reads out the calendar data stored in a memory and adds the content of the date counter to the calendar data so as to perform the processing such as the updating process of year, month and date and the updating process for the leap year, when the CPU is operated in response to the start operation by provision of a keyboard or a reader/writer to which the electronic device is connected.

8 Claims, 4 Drawing Sheets

ELECTRONIC DEVICE WITH CALENDAR FUNCTION

BACKGROUND OF THE INVENTION

1. Field of the Invention

The present invention relates to an electronic device such as an electronic calculator or IC card which has a calendar function (the function of counting and displaying the year, month and date (including the day of the week)) and which can be energized by an external power source or a built-in battery.

2. Description of the Related Art

Recently, with the development of microcomputers, various card-like calculators or IC cards have been developed. Some of the desk calculators and IC cards have a time counting or calendar function. For example, European Patent Publication No. EP 0 167 044 (inventor: K. Rikuna et al.), discloses an intelligent card which realizes the calendar function by hardware. However, since the calendar function of the above intelligent card is realized by a complete set of hardware circuits, the circuit arrangement becomes complex to adjust the month count depending on the number of days of the month, and the date count depending on the leap year. Therefore, the chip size is increased, which is undesirable for a thin card-like calculator or the IC card.

The calendar data may also be updated by soft-ware. In this case, each time the date data is changed, the calendar data stored in a memory are read out. The calendar data is incremented by "1" to be updated. The updated calendar data are rewritten in the memory. In order to update the calendar data as described above, it is necessary to automatically turn on the power source once a day so as to operate the CPU which in turn updates calendar data. Therefore, even if a user does not use the card-like calculator or IC card, the device itself regularly operates, thus dissipating the power of the built-in battery. As a result, the service life of a capacity-limited built-in battery used in the card-like calculator or IC card is undesirably shortened.

SUMMARY OF THE INVENTION

An object of the present invention is to provide an electronic device with calendar function which can reliably update the calendar data without increasing the chip size of the circuit and without dissipating battery power.

To achieve the above object, an electronic device with a calendar function includes a clock signal generating circuit for generating a clock signal; a memory for storing calendar data; a time data generating circuit for generating time data in response to the clock signal generated from the clock signal generating circuit; a date counter for counting the time data generated from the time data generating circuit to produce count data; and a control unit for updating the calendar data stored in the memory based on the count data from the date counter when the control unit is operated in response to an external start operation.

According to the electronic device with a calendar function of this invention, the date counter is provided for counting a carry signal generated from a timer circuit for every 24 hours. For example, when an input operation is effected from a keyboard of the electronic device or when a power source voltage is externally supplied thereto by connecting the electronic device to an IC card reader/writer and performing a predetermined operation, for example, the count data of the date counter is added to the calendar data in the memory by utilizing the power required for performing the predetermined operation. Therefore, the CPU which consumes relatively large power is not operated when the electronic device is not used by a user. As a result, the calendar data can be updated as if no power were required apparently therefor.

BRIEF DESCRIPTION OF THE DRAWINGS

Other objects and features of the present invention will be apparent from the following description taken in connection with the FIGURES in which.

DETAILED DESCRIPTION OF THE PREFERRED EMBODIMENTS

Figure 1:
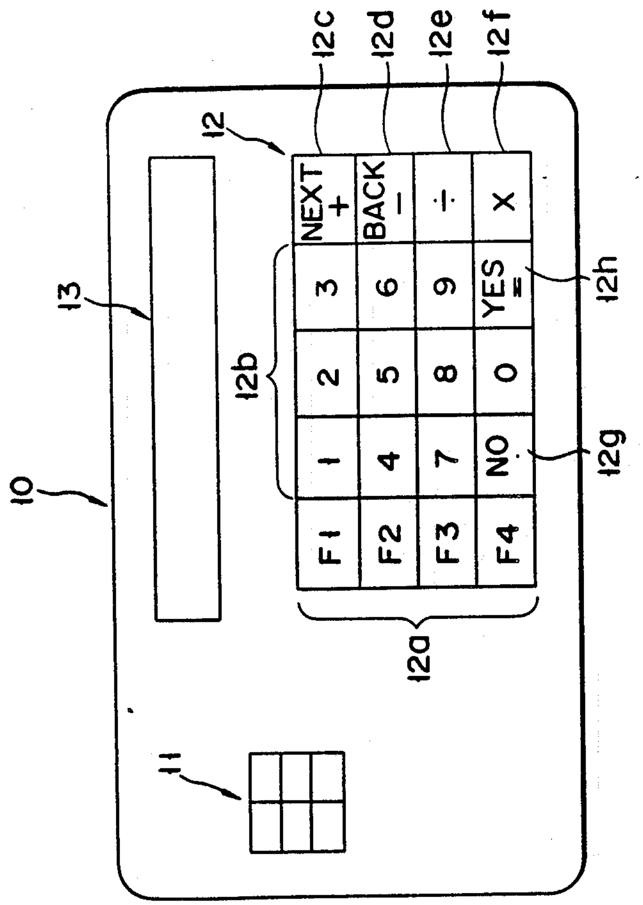
FIG. 1 is a plan view showing an arrangement of an IC card to which the present invention is applied.

FIG. 1 is a plan view showing an arrangement of an IC card to which the present invention is applied. Contact portion 11, which is connected to an IC card reader/writer unit (not shown), keyboard section 12 and display section 13, constituted by liquid crystal display elements, are provided on the upper surface of IC card 10.

Keyboard section 12 includes function keys (F1, F2, F3, F4) 12*a* for specifying the processing mode; numeric keys 12*b;* arithmetic keys, or addition (+) key 12*c,* subtraction (−) key 12*d,* division (÷) key 12*e* and multiplication (×) key 12*f;* decimal point (.) key 12*g;* and equal (=) key 12*h.*

Function keys 12*a* selects any one of the processings for desk calculator mode (F1), time display mode (F2), electronic passbook mode (F3) and purchasing mode (F4) in an off-line processing or when the processing is effected by IC card 10 alone. In the transaction mode, processings corresponding to the type of card such as a credit card and a cash card is selected in accordance with the combination of the F4 key and numeric keys 12*b.*

Addition key 12*c* is also used as a key to advance the display state of display unit 13. In contrast, subtraction key 12*d* is also used as a BACK key to change the display state of display unit 13 to a previous one. Further, decimal point key 12*g* is used as a "NO" key, or a completion key, and equal key 12*h* is used as a "YES" key and a power source key. The functions of these keys are determined depending on the selected mode. Note that the mode selection and the key function are not directly related to the present invention and therefore a detailed explanation thereof has been omitted.

Figure 2:
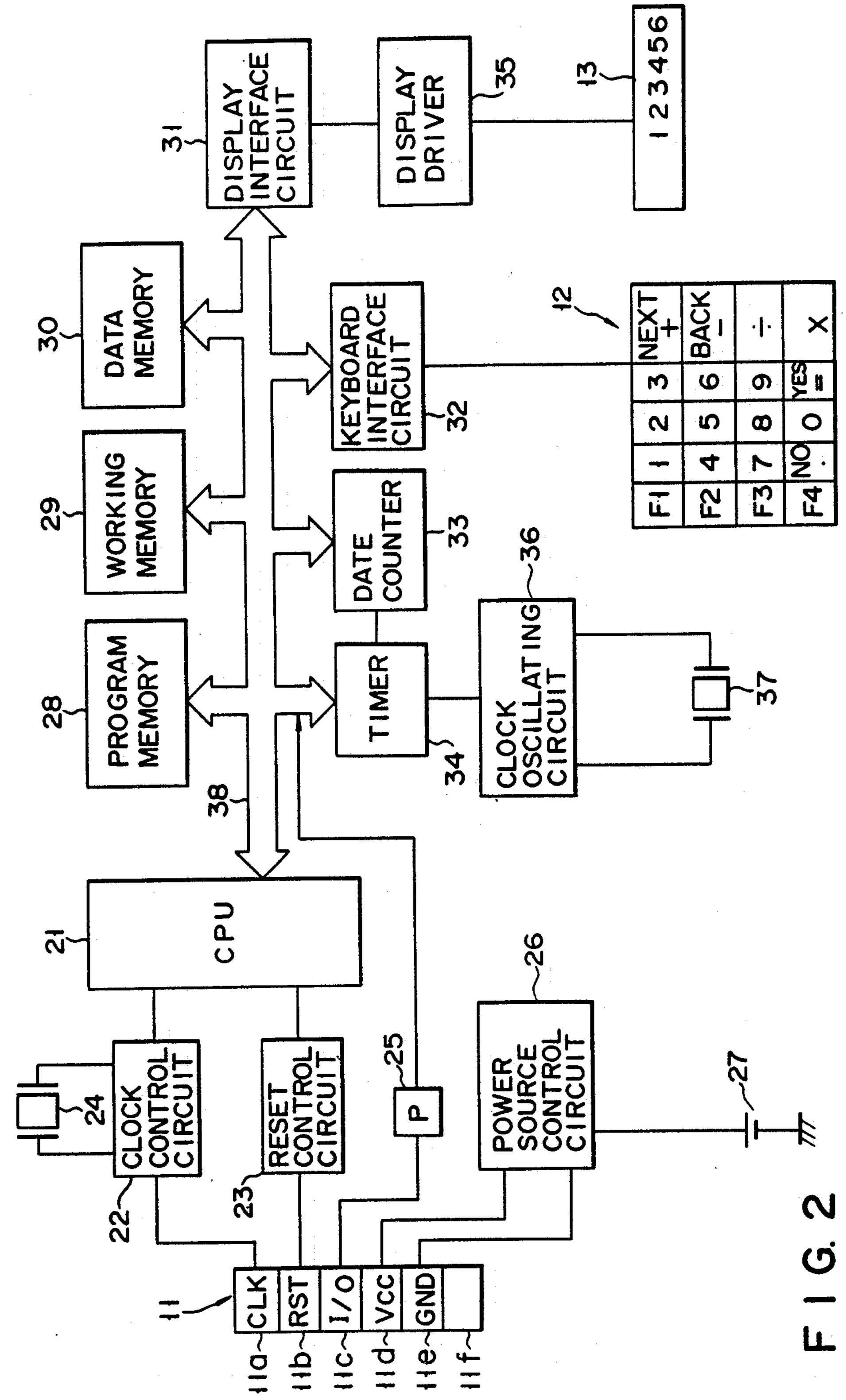
FIG. 2 is a block diagram of an electronic device with calendar function according to one embodiment of the present invention.

The circuit of IC card 10 is arranged as shown in FIG. 2.

In FIG. 2, contact portion 11 comprises clock signal terminal 11*a*, reset signal terminal 11*b*, data input/ output (I/O) terminal 11*c*, power source voltage supply terminal 11*d,* ground terminal 11*e* and open terminal 11*f.* Clock control circuit 22 and reset control circuit 23 are provided between terminals 11*a* and 11*b*, and central processing unit (CPU) 21, respectively. Crystal oscillator 24 for generating a signal of 1 MHz is connected to clock control circuit 22. One-bit I/O port (P) 25 is connected between terminal 11*c* and system bus 38 of CPU 21. Further, power source control circuit 26 to which built-in battery 27 is connected is connected to terminals 11*d* and 11*e*.

System bus 38 of CPU 21 is connected to program memory 28 storing a control program, working memory 29, data memory 30 for storing a 4-digit password, for example, and calendar data, display interface circuit 31, keyboard interface circuit 32, binary date counter 33 and timer circuit 34 which is connected to date counter 33. For example, date counter 33 and timer circuit 34 may be constructed by a universal counter.

Interface circuit 31 is connected to display section 13 via display driver circuit 35, and keyboard interface circuit 32 is connected to keyboard section 12. Further, timer circuit 34 is connected to clock oscillating circuit 36 which is also connected to crystal oscillator 37 for generating a signal of 32.768 KHz, for example.

When IC card 10 is standing by or in a key-input wait mode (no keys are depressed for a period of time) in an off-line mode in which the card operates using built-in battery 27, clock control circuit 22 stops the supplement of the clock signals to CPU 21 to completely cease the CPU operation. If, in the ceased state, power source key (equal key) 12*h* is depressed, clock signals are supplied to CPU 21.

Reset control circuit 23 supplies a trigger signal to CPU 21 in response to a reset signal which is internally or externally supplied thereto.

Upon receiving the external power source, power source control circuit 26 switches to the external power source from built-in battery 27 after a predetermined period of time. On the contrary, circuit 26 switches to built-in battery 27 from an external power source when the external power source voltage is lowered to a certain level or when the external power source is turned off.

Program memory 28 stores an on-line processing program, an off-line processing program, and a test program (self-diagnosis program) to be executed when IC card 10 is manufactured.

Display interface circuit 31 converts the display data supplied from CPU 21 into a character pattern by use of a character generator (not shown) which is formed of an internal ROM, and displays the character pattern on display unit 13 by means of display driver circuit 35.

Keyboard interface circuit 32 supplies to CPU 21 a key input signal corresponding to a key actuated on keyboard section 12.

Timer circuit 34 keeps counting an output signal from clock oscillator circuit 36 to produce time data representing hours, minutes and seconds. Date counter 33 counts a carry signal supplied from timer circuit 34 for every 24 hours.

The calendar data updating operation of the electronic device with calendar function as described above will now be explained with reference to the flowcharts shown in FIGS. 3A and 3B.

Figure 3A:
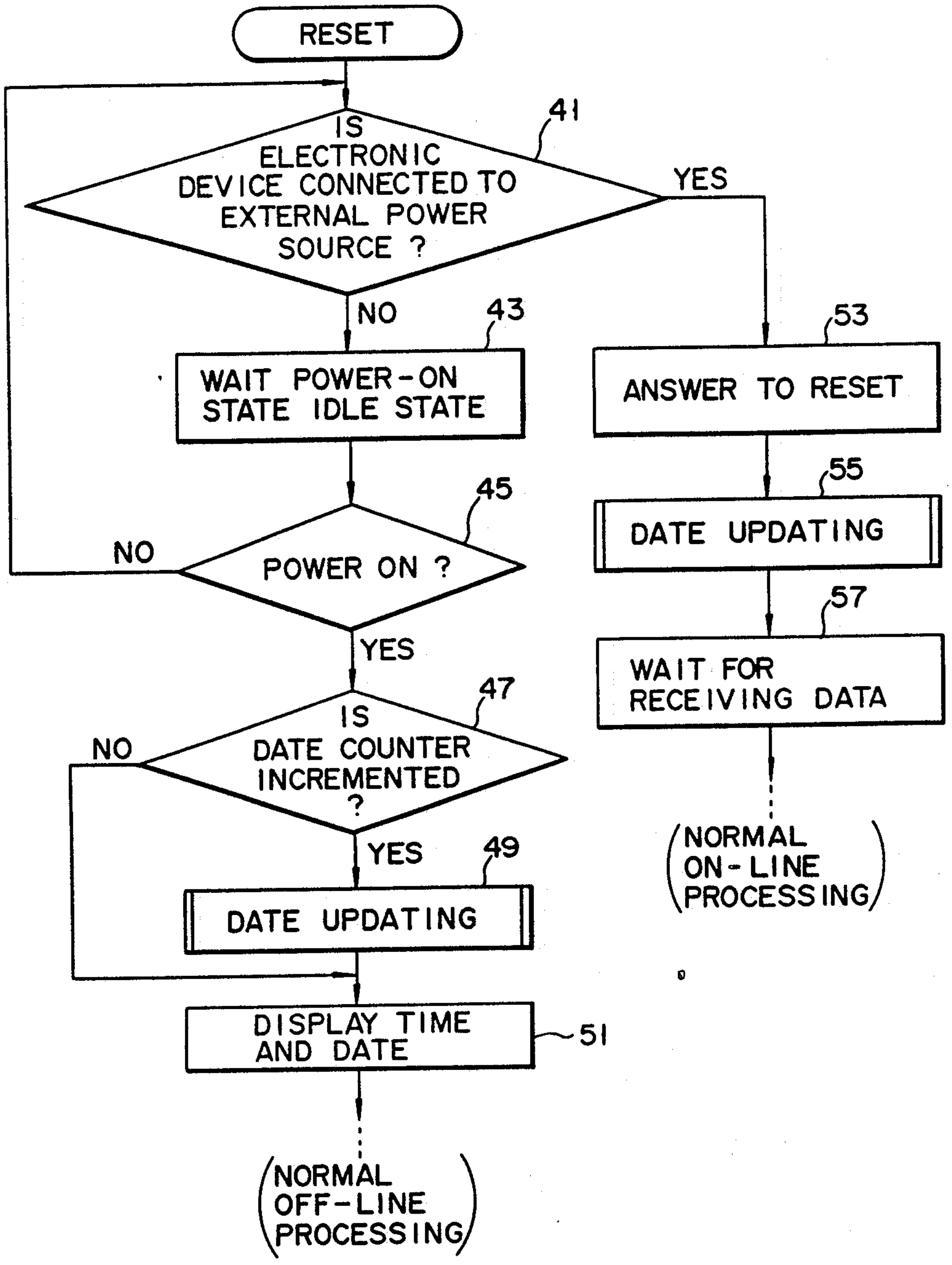
FIG. 3A is a flowchart showing a reset processing routine.
Figure 3B:
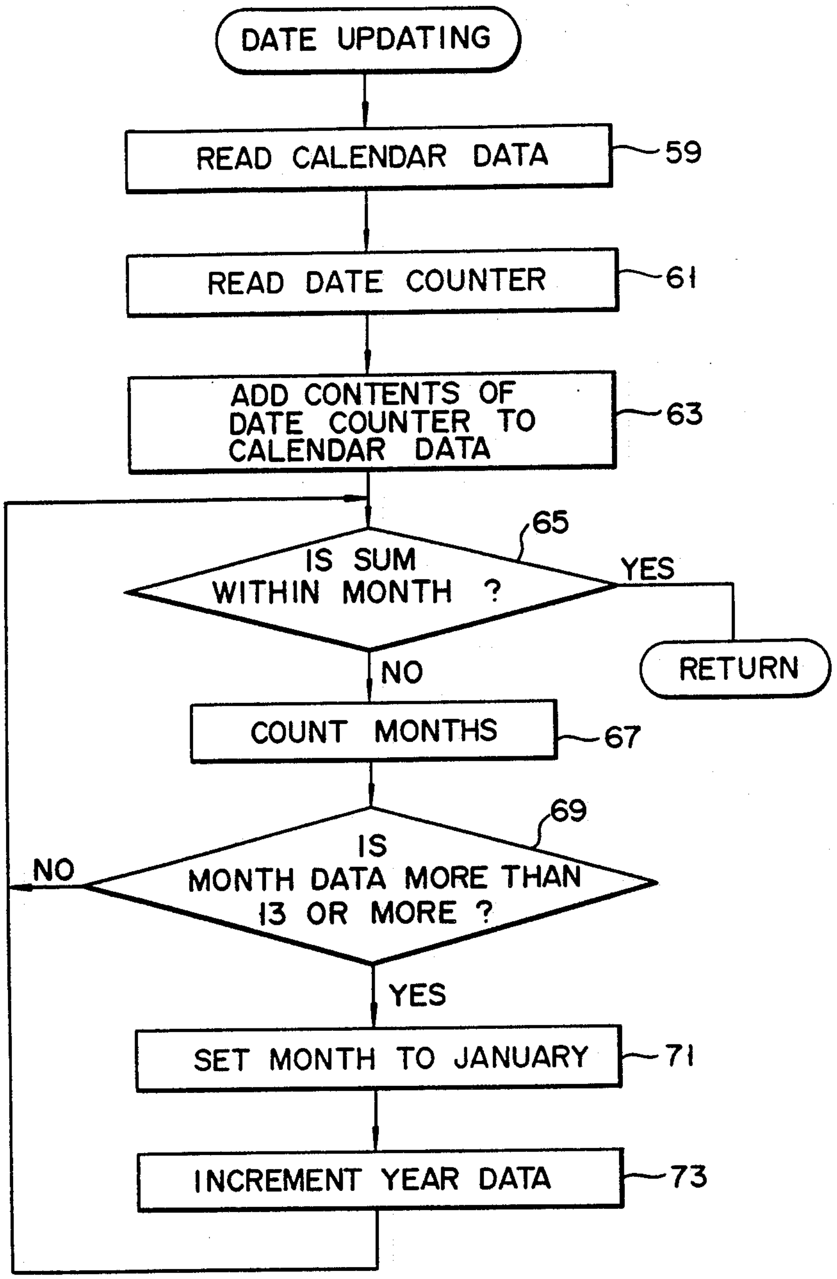
FIG. 3B is a flowchart showing a detail of the date updating subroutine shown in FIG. 3A.

FIG. 3A and 3B are flowcharts respectively showing the reset processing effected by reset control circuit 23 shown in FIG. 2 and the date updating processing effected by CPU 21.

In step 41 shown in FIG. 3A, it is determined whether or not a power source voltage is externally supplied to the electronic device. Assume now that power source key ("YES" key) 12*h* of keyboard section 12 is actuated to turn on the power source, thus permitting an output voltage of built-in battery 27 to be supplied to CPU 21. In this case, it is determined in step 41 that the power source voltage is not externally supplied, and therefore CPU 21 waits in step 43 until the power is turned on. That is, CPU 21 is set in the idle state. If it is detected in step 45 that power source voltage is supplied to CPU 21, CPU 21 determines in step 47 whether or not date counter 33 is counted up. If "NO" in step 47, the date and the time (hours, minutes and seconds) are displayed on display unit 13 in step 51. That is, in this case, CPU 21 first reads out time data (hours, minutes and seconds) of timer circuit 34, count data of date counter 33 and calendar data (year, month and date) which have been stored in data memory 30 when the power source has been last turned on. Then, CPU 21 displays the time data and the date data from the read-out calendar data on display section 13 through display interface circuit 31 and display driver circuit 35.

In contrast, if it is determined in step 47 that date counter 33 is counted up, CPU 21 performs the date updating process in step 49. That is, in step 59 shown in FIG. 3B, CPU 21 reads out calendar data (year, month, date and day of the week) from data memory 30. Then, CPU 21 reads out count data from date counter 33 in step 61. Next, CPU 21 adds the count data of date counter 33 to the calendar data read out from data memory 30. That is, the count data of date counter 33 is added to the date data included in the calendar data, and it is determined in step 65 whether or not the addition result exceeds the limit number of days for the month (30 or 31 days, for example). If the addition result is not in excess of the limit number of days, CPU 21 returns to step 51 in FIG. 3A and displays the time data and the date data. On the contrary, if it is determined in step 65 that the addition result exceeds the limit number of days, month data is incremented in step 67 and then it is determined in step 69 whether the added month data is more than 12 or not. If it is determined that the added month data is more than 12, the month data is set to "1" (indicating January) in step 71, and year data is incremented by "1" in step 73. The year updating processing described above includes the updating processing for the leap year.

Calendar data attained by updating year, month and date is transferred to display unit 13 via display interface circuit 31 and display driver circuit 35 in step 51 shown in FIG. 3A, and is displayed on display section 13.

Now, assume that the electronic device communicates with an external device via contact portion 11 in step 41 in FIG. 3A. In this case, it is determined in step 41 of FIG. 3A that a power source voltage is externally supplied. Therefore, CPU 21 supplies an "answer to reset" signal, which indicates that it is ready for receiving data, to the external device in step 53. Then, in step 55, date updating process as described with reference to FIG. 3B is effected. Thereafter, CPU 21 is set ready for receiving data from the external device in step 57. The succeeding processings are the same as those of an ordinary on-line processing, and therefore the explanation thereof is omitted.

In the above embodiment, date counter 33 is provided which is incremented by means of timer circuit 34 for every 24 hours. The calendar data attained when the power source is last turned on are stored in data memory 30. When the power source of the IC card is turned on, the count data of date counter 33 is added to the calendar data to update data of year, month and date, thereby providing correct calendar data. Thus, unlike the prior art, it becomes unnecessary to operate CPU 21 for every 24 hours in order to update the calendar data, thereby reducing the power consumption of built-in battery 27.

Further, when the power source of the IC card is turned off, the power of built-in battery 27 is consumed by timer circuit 34 and date counter 33. However, since timer circuit 34 and date counter 33 are formed of simple-structured circuits, the power consumption is considerably reduced in comparison with the case where the calendar function is realized all by hardware circuits.

In the above embodiment, the present invention applies to an IC card. However, the present invention is not limited to the above embodiment and can apply to various electrical devices.

What is claimed is:

1. An electronic device having memory means for storing calendar data, said device comprising:

power source means for supplying electrical power to said electronic device;

a contact portion for connecting said electronic device to an external device;

clock signal generating means for generating a clock signal;

timer means for generating time data in response to the clock signal generated from said clock signal generating means;

date counter means for counting the time data generated from said timer means and for producing a count data; and central processing unit means for updating the calendar data stored in said memory means based on the count data from said date counter means, in response to a power source voltage being supplied from the external device via said contact portion.

2. The electronic device according to claim 1, said central processing unit means clearing the contents of said date counter means after completion of the calendar data updating operation.

3. An electronic device having memory means for storing calendar data, said device comprising:

power source means for supplying electrical power to said electronic device;

a keyboard having a group of keys for inputting data;

clock signal generating means for generating a clock signal;

timer means for generating time data in response to the clock signal generated from said clock signal generating means;

date counter means for counting the time data generated from said timer means and for producing a count data; and central processing unit means for updating the calendar data stored in said memory means based on the count data from said date counter means, in response to a key of said keyboard being operated and said power source means being turned on, and for clearing the contents of said date counter means after completion of the calendar data updating operation.

4. The electronic device according to claim 3, wherein the key of said keyboard includes a power on key and said central processing unit means performs the calendar data updating operation by use of power supplied to said central processing unit means for processing key-in data input from said keyboard.

5. The electronic device according to claim 4, further comprising display means and in which said central processing unit means reads out the calendar data from said memory means in response to the operation of said power on key and drives said display means to display the read-out calendar data.

6. An electronic device having a memory means for storing calendar data, said device comprising:

power source means for supplying electrical power to said electronic device;

clock signal generating means for generating clock signals;

time data generating means for generating time data in response to the clock signals from said clock signal generating means;

counter means for counting the time data generated from said time data generating means to produce count data; and control means for updating the calendar data stored in said memory means based on the count data from said counter means when said control means changes from a wait state to an operation state, and for clearing the contents of said counter means after completion of the calendar data updating operation.

7. The electronic device according to claim 6, further comprising a keyboard including a power on key, and said control means performing the calendar data updating operation by use of power supplied to said control means for processing key-in data input from said keyboard.

8. The electronic device according to claim 7, further comprising display means, and said control means reading out the calendar data from said memory means in response to the operation of said power on key driving said display means to display the read-out calendar data.

* * * * *